(12) United States Patent  
Dodson

(10) Patent No.: US 7,780,922 B2  
(45) Date of Patent: Aug. 24, 2010

(54) APPARATUS FOR PRODUCING AMORPHOUS SILICA ASH

(75) Inventor: Christopher E. Dodson, Reading (GB)

(73) Assignee: Mortimer Technology Holdings Limited, Mortimer Reading (GB)

( * ) Notice: Subject to any disclaimer, the term of this patent is extended or adjusted under 35 U.S.C. 154(b) by 0 days.

(21) Appl. No.: 12/461,385

(22) Filed: Aug. 10, 2009

(65) Prior Publication Data

US 2010/0040508 A1    Feb. 18, 2010

Related U.S. Application Data

(60) Division of application No. 10/133,584, filed on Apr. 29, 2002, now Pat. No. 7,585,481, which is a continuation of application No. 09/746,403, filed on Dec. 26, 2000, now abandoned.

(51) Int. Cl.
   *B01D 50/00* (2006.01)
(52) U.S. Cl. .................................. 422/182; 422/183
(58) Field of Classification Search ................ 422/182, 422/183
   See application file for complete search history.

(56) References Cited

U.S. PATENT DOCUMENTS

| 1,293,008 A | 2/1919 | Blardone |
| 2,987,408 A | 6/1961 | Minnick |
| 3,125,043 A | 3/1964 | Gravel |

(Continued)

FOREIGN PATENT DOCUMENTS

GB              1432707        4/1976

OTHER PUBLICATIONS

Author Unknown; "A prized process for industry"; Apr. 17, 1990; The Daily Telegraph.

(Continued)

*Primary Examiner*—Edward M Johnson

(57) ABSTRACT

The invention provides apparatus and a method for exothermic treatment of feed material to provide an ash. The apparatus includes a housing extending about a central axis and having first and second ends, and a central mixing zone adjacent the first end. A material intake carries the feed material into the housing and gas enters through a first gas inlet at the first end through guides to create an inner vortex extending axially about said axis and the gas then follows an outer vortex which also extends axially but in the opposite direction from that of the inner vortex. However the inner and outer vortices rotate in the same direction. A gas outlet is positioned to receive spent gas from the housing and an ash outlet is positioned remotely from the mixing zone to receive the ash. If preferred, the position of the ash outlet may be incorporated into the gas outlet. A control system is provided to limit the temperature in the feed material in the housing. As a result, in operation, gases can be fed into the first and second gas inlets carrying sufficient oxygen for exothermic combustion of the feed material and having a flow rate to create said inner and outer vortices. The outer vortex meets the inner vortex in the mixing zone to mix both with the inner vortex and with the feed material which will be subjected to exothermic combustion as the feed material is entrained in the inner and outer vortices. The material will pass through the mixing zone repeatedly until the feed material is converted to the desired ash having escape criteria needed to reach and exit through the ash outlet.

27 Claims, 1 Drawing Sheet

U.S. PATENT DOCUMENTS

| | | |
|---|---|---|
| 3,451,944 A | 6/1969 | Finch |
| 3,511,601 A | 5/1970 | Bieler et al. |
| 3,568,610 A | 3/1971 | Hughes |
| 3,855,395 A | 12/1974 | Cutler |
| 3,951,907 A | 4/1976 | Mehta |
| 3,959,007 A | 5/1976 | Pitt |
| 4,105,459 A | 8/1978 | Mehta |
| 4,214,920 A | 7/1980 | Amick et al. |
| 4,248,844 A | 2/1981 | Ramsey, Jr. et al. |
| 4,308,065 A | 12/1981 | Walls-Muycelo |
| 4,349,534 A | 9/1982 | Eigen et al. |
| 4,441,412 A | 4/1984 | Imamura et al. |
| 4,442,130 A | 4/1984 | Autrey et al. |
| 4,496,674 A | 1/1985 | Ehrhart et al. |
| 4,555,448 A | 11/1985 | Durham |
| 4,571,389 A | 2/1986 | Goodwin et al. |
| 4,619,911 A | 10/1986 | Goodwin et al. |
| 4,623,682 A | 11/1986 | Nicholson et al. |
| 4,707,176 A | 11/1987 | Durham |
| 4,829,107 A | 5/1989 | Kindt et al. |
| 4,842,144 A | 6/1989 | Yahashi |
| 5,070,851 A | 12/1991 | Janisch |
| 5,073,281 A | 12/1991 | Paules et al. |
| 5,133,834 A | 7/1992 | Capps |
| 5,147,852 A | 9/1992 | Cowan et al. |
| 5,302,200 A | 4/1994 | Smetana et al. |
| 5,346,548 A | 9/1994 | Mehta |
| 5,352,288 A | 10/1994 | Mallow |
| 5,360,633 A | 11/1994 | Dean |
| 5,503,931 A | 4/1996 | Goodman, Sr. |
| 5,509,962 A | 4/1996 | Tang |
| 5,536,310 A | 7/1996 | Brook et al. |
| 5,556,458 A | 9/1996 | Brook et al. |
| 5,569,153 A | 10/1996 | Mallow et al. |
| 5,601,643 A | 2/1997 | Silverstrim et al. |
| 5,624,489 A | 4/1997 | Fu et al. |
| 5,714,000 A | 2/1998 | Wellen et al. |
| 5,792,252 A | 8/1998 | Sprouts |
| 5,833,940 A | 11/1998 | Reiber et al. |
| 5,858,911 A | 1/1999 | Wellen et al. |
| 5,863,323 A | 1/1999 | Mahmud et al. |
| 5,968,254 A | 10/1999 | Dodgen et al. |
| 6,027,561 A | 2/2000 | Gruber et al. |
| 6,038,987 A | 3/2000 | Koshinski |
| 6,114,280 A | 9/2000 | Stephens |

OTHER PUBLICATIONS

Author Unknown; "Low Temperature Thermal Treatment(LT³®) System—Roy R. Weston, Inc."; Sep. 1992; demonstration bulletin article. Superfund Innovative Technology Evaluation, United States Environmental Protection Agency.

DePercin, Paul R.; "Low Temperature Thermal Treatment(LT³®)System—Roy R. Weston, Inc., Applications Analysis Report"; Dec. 1992; United States Environmental Protection Agency.

Marks, P. et al.; Remediation technologies screening matrix and reference guide; Second Ed.; Section 4.21 High Temperature Thermal Absorption; Oct. 1994; pp. 4-85 to 4-88; U.S. Department of Defence.

Marks, P. et al.; Remediation technologies screening matrix and reference guide; Second Ed.; Section 4.24 Low Temperature Thermal Absorption; Oct. 1994; pp. 4-97 to 4-100; U.S. Department of Defence.

Author Unknown; "A Citizen's Guide to Thermal Desorption"; Apr. 1996; fact sheet, United States Environmental Protection Agency.

Atkins, M. et al.; "Torbed: A Novel Thermal Process to Clean Oily Cuttings"; Publication date unknown.

Groszek, M.A.; "The Torbed Process: A Novel Concept in Heat and Mass Transfer"; Proceedings of the International Deep Mining Conference: Innovations in Metallurgical Plant, Johannesburg: 1990; SAIMM; pp. 191 to 195.

McKee, Davy; "Application of a Torbed Pilot Plant to Catalyst Manufacture"; Publication date unknown.

APPARATUS FOR PRODUCING AMORPHOUS SILICA ASH

CROSS REFERENCE TO RELATED APPLICATIONS

This application is a divisional of U.S. patent application Ser. No. 10/133,584 filed on Apr. 29, 2002 now U.S. Pat. No. 7,585,481, which is a continuation of U.S. patent application Ser. No. 09/746,403 filed Dec. 26, 2000 now abandoned all of which are hereby incorporated by reference.

FIELD OF THE INVENTION

This invention relates to thermal processes of the type used to remove carbon and volatiles from siliceous materials to produce a predominantly amorphous silica ash having a relatively low carbon content, and to apparatus used in such thermal processes.

DESCRIPTION OF THE PRIOR ART

Agricultural products create waste materials such as rice hulls, rice straw, wheat chaff, and straw that are relatively high in siliceous content. It is well known that these waste materials would be useful industrially if the carbon content could be removed efficiently and economically to produce an ash having a predominantly amorphous silica content with less than 3% carbon. Clearly a thermal process that would produce such material would have the added benefit of redirecting waste materials from disposal facilities to a useful industry.

In general, the materials vary in their physical characteristics such as shape, density, water content, and inclusion of tramp and extraneous mineral matter, and they also exhibit relatively low calorific values when compared with liquid or gaseous hydrocarbons.

Rice hulls are an example of such waste materials and they demonstrate the type of problems associated with the disposal of similar waste materials. Although rice hulls have found some minor uses such as fuel in low calorific production of energy, and as a cover to exclude oxygen from the surface of molten steel, large amounts of rice hull waste can be found around the world making disposal a particular problem.

Clearly there is a need to find economically feasible uses for these waste materials that are inevitable by-products of the production of products that will continue to be in high demand.

It is known that amorphous silica ash would be desirable as a pozzolan in concrete if the ash could be made to have a silica content in excess of 97% by weight with minor amounts of crystalline silica in the order of less than 1% of the total silica. The remaining 3% will be made up of carbon and some trace elements. To achieve this result efficiently in a commercial process, the waste material would have to be incinerated at an elevated temperature sufficient to burn off the carbon and volatiles efficiently and yet avoid hot spots which will result in incomplete combustion due to encapsulation of carbon by the formation of glassy coatings. If the temperature is allowed to pass a critical level in any part of the process, the silica will agglomerate as it becomes tacky with detrimental results for the apparatus, and the internal pore surface area of the ash particles will be reduced. Also, if the temperature is further elevated locally, silica in that area will convert to a crystalline structure which is dangerous to handle, and the resulting product will be unsuitable for use as a pozzolan.

An example of a process and apparatus existing in the art is found in U.S. Pat. No. 3,959,007 to Pitt. This patent issued in 1976 and describes a method which involves the use of a cylindrical furnace arranged to receive material in an outer spiral which extends upwardly before meeting a shaped top to deflect the flow into an inner spiral extending downwardly to an exit. The inner and outer spirals rotate in the same direction but travel in opposite axial directions in the furnace. The spirals are effectively one long spiral which reverses direction at the top of the furnace.

Accordingly, it is among the objects of this invention to provide methods for thermal treatment of waste materials such as siliceous materials with improved activity inside the apparatus for better control of the output.

It is also an object of the invention to produce amorphous silica ash having low carbon content and minimal crystalline structure so that the ash can be used as a pozzolan, particularly in concrete.

SUMMARY OF THE INVENTION

In one aspect, there is provided an apparatus for the thermal treatment of waste materials, the apparatus including an intake to receive material for combustion and an ash outlet to discharge ash produced by combustion of the material, a gas supply and a spent gas outlet, a first vortex generator and a second vortex generator to create inner and outer gas vortices respectively in the apparatus about a common axis, the vortices defining a gas stream which leaves via the spent gas outlet and the gas stream containing sufficient oxygen for exothermic combustion of the feed material, the vortex generators being arranged provide flow in opposite axial directions and in the same angular direction, wherein the apparatus further includes a mixing zone located adjacent each of the vortices, the intake delivering feed material to the apparatus at the mixing zone to be entrained in the inner vortex with a centrifugal force component to cause the material to move outwardly from the inner vortex into the outer vortex and so that the material is then entrapped in the gas stream and carried repeatedly by the outer vortex into and through the mixing zone for entry back into the inner vortex so that the material is transported in the gas stream until the feed material is converted predominantly to an ash having escape criteria needed to travel through the ash outlet.

In another aspect, there is provided an apparatus for making ash from a feed material, the apparatus including: a cylindrical housing extending about a central axis and having first and second ends, and a central mixing zone adjacent the first end; a material intake for carrying the feed material into the housing and having a bottom outlet in the mixing zone; a flow rate controller coupled to the material intake to vary the rate of flow of feed material through the intake; a first gas inlet at the first end and having guides to create an inner vortex extending about the axis; a second gas inlet at the second end and having guides to create an outer vortex extending about the axis, the inner and outer vortices rotating in the same direction about the axis and moving axially in opposite directions to create a gas stream; a gas outlet positioned to receive spent gas from the housing; an ash outlet positioned remotely from the mixing zone; and a control system having temperature sensors in the gas stream and operable in response to changes in temperatures in the gas stream to operate the flow rate controller to vary the rate of flow of the feed material into the mixing zone in accordance with temperature parameters set to limit the temperature in the feed material in the gas stream; whereby in operation gases are fed into the first and second gas inlets to create the gas stream with sufficient oxygen for exothermic combustion of the feed material and having a flow rate to create the inner and outer vortices, the outer vortex meeting the inner vortex in the mixing zone to mix both with the inner vortex and with the feed material leaving the material intake, so that the feed material will be subjected to exothermic combustion as the feed material is entrained in the gas stream to pass through the mixing zone repeatedly until the feed material is converted predominantly to ash having escape criteria needed to exit through the ash outlet.

In yet another aspect, there is provided an apparatus for exothermic treatment of siliceous feed material, the apparatus including: a cylindrical housing extending about a central axis and having first and second ends, and a central mixing zone adjacent the first end; a material intake for carrying the feed material into the housing and having a bottom outlet in the mixing zone; a flow rate controller coupled to the material intake to vary the rate of flow of feed material through the intake; a first gas inlet at the first end and having guides to create an inner vortex extending about the axis; a second gas inlet at the second end and having guides to create an outer vortex extending about the axis, the inner and outer vortices rotating in the same direction about the axis and moving axially in opposite directions to create a gas stream; a gas outlet positioned to receive spent gas from the housing; and a control system having temperature sensors in the gas stream and operable in response to changes in temperatures in the gas stream to operate the flow rate controller to vary the rate of flow of the feed material into the mixing zone in accordance with temperature parameters set to limit the temperature in the feed material in the gas stream; whereby in operation gases are fed into the first and second gas inlets to create a gas stream and carrying sufficient oxygen for exothermic combustion of the feed material and having a flow rate to create the inner and outer vortices, the outer vortex meeting the inner vortex in the mixing zone to mix both with the inner vortex and with the feed material leaving the material intake, so that the feed material will be subjected to exothermic combustion as the feed material is entrained in the gas stream to pass through the mixing zone repeatedly until the feed material is converted predominantly to amorphous silica ash having escape criteria needed to exit through the gas outlet with the spent gas.

In yet another aspect, there is provided an apparatus for exothermic treatment of siliceous feed material, the apparatus including: a cylindrical housing extending axially about a central axis and having first and second ends, and a central mixing zone adjacent the first end; a material intake for carrying the feed material into the housing and having an outlet in the mixing zone; a first gas inlet at the first end and having guides to create an inner vortex extending axially; a second gas inlet at the second end and having guides to create an outer vortex extending about the axis, the inner and outer vortices rotating in the same direction about the axis and moving axially in opposite directions to define a gas stream; a gas outlet positioned centrally in the second end to receive spent gas from the housing; an ash outlet positioned remotely from the mixing zone; and a control system having temperature sensors in the gas flow and operable in response to changes in temperatures in the gas flow to limit the temperature in the feed material in the housing; whereby in operation gases are fed into the first and second gas inlets carrying sufficient oxygen for exothermic combustion of the feed material and having a flow rate to create the inner and outer vortices, the outer vortex meeting the inner vortex in the mixing zone to mix both with the inner vortex and with the feed material leaving the material intake, so that the feed material will be subjected to exothermic combustion as the feed material is entrained in the gas stream to pass through the mixing zone repeatedly until the feed material is converted predominantly to amorphous silica ash having escape criteria needed to leave the gas stream and exit through the ash outlet.

In yet another aspect, there is provided an apparatus for exothermic treatment of siliceous feed material, the apparatus including: a cylindrical housing extending about a central axis and having a first and second ends, and a central mixing zone adjacent the first end; a material intake for carrying the feed material into the mixing zone; a first gas inlet at the first end and having guides to create an inner vortex extending about the axis; a second gas inlet at the second end and having guides to create an outer vortex extending about the axis, the inner and outer vortices rotating in the same direction about the axis and moving axially in opposite directions, and the first and second vortices creating a gas stream; a gas outlet positioned centrally in the second end to receive spent gas from the housing; and a control system having temperature sensors in the gas stream and operable in response to changes in temperatures in the gas stream to limit the temperature in the feed material in the housing; whereby in operation gases are fed into the first and second gas inlets carrying sufficient oxygen for exothermic combustion of the feed material and having a flow rate to create the inner and outer vortices, the outer vortex meeting the inner vortex in the mixing zone to both mix with the inner vortex and with the feed material leaving the material intake, so that the feed material will be subjected to exothermic combustion as the feed material is entrained in the gas stream to pass through the mixing zone repeatedly until the feed material is converted to a predominantly amorphous silica ash having escape criteria needed to move in the gas stream to the gas outlet with the spent gas.

BRIEF DESCRIPTION OF THE DRAWINGS

The invention and its various aspects will be better understood with reference to the accompanying drawings, in which.

DESCRIPTION OF THE PREFERRED EMBODIMENTS

Figures 1, 2:
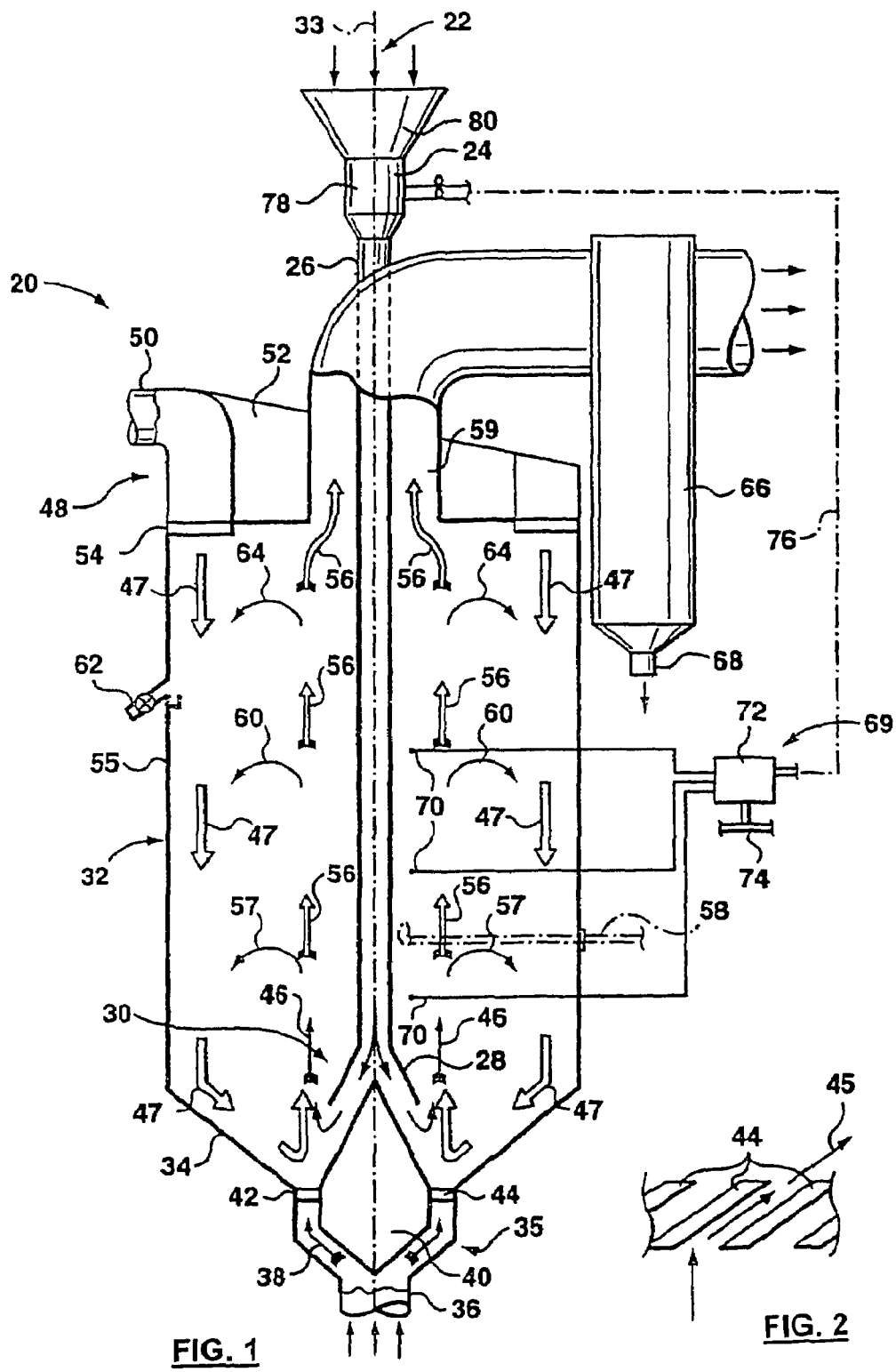
FIG. 1 is a schematic cross-sectional view of apparatus used in practising a preferred method of the invention and showing the apparatus in a vertical orientation.
FIG. 2 is a diagrammatic side view of part of a guide used in the apparatus to create vortex gas flow.

Reference is first made to FIG. 1 to describe apparatus used in practising the invention and designated generally by the numeral 20. The apparatus will be described with reference to the process of treating exemplary feed material 22 that enters through a material intake 24 and falls down a feed tube 26 to exit annularly at a flared bottom outlet 28. The outlet 28 is located in an annular mixing zone designated generally by the numeral 30 and provided to mix the incoming feed material both with flowing gas and with feed material which is already entrapped in the gas flow, as will be described.

The apparatus 20 includes a cylindrical housing 32 that extends vertically about a central axis 33 that is also the axis of the feed tube 26. A bottom 34 of the housing 32 is frusto-conical, tapering downwardly to meet a first gas inlet 35. This inlet 35 consists of an inlet pipe 36 leading the incoming gas upwardly to an annular path 38 about a central divider 40 to bring the gas into engagement with an annular guide 42 at the bottom 34 of the housing 32. The annular guide 42 consists of a series of spaced blades 44 arranged as shown in FIG. 2 to cause the gas to leave the guide 42 in a helical path or vortex as suggested by arrows 45. This vortex is an inner vortex and sets out to move vertically through the mixing zone 30 and along the axis 33 of the housing 32 as indicated by the arrows 46.

The mixing zone 30 is also affected by an outer vortex indicated by arrows 47 and created by gas supplied from a second gas inlet 48 having an inlet pipe 50 leading to a top manifold 52 feeding an annular guide 54 similar to guide 42 at the bottom of the housing 32. The annular guide 54 is positioned to develop an outer vortex having the same direction of angular rotation as the inner vortex. This outer vortex moves downwardly following the inner surface of a cylindrical outer wall 55 of the housing 32 before being deflected inwardly towards the annular mixing zone by the frusto-conical bottom 34. As a result the outer vortex meets both the inner vortex and the feed material 22 in the mixing zone 30 before the inner vortex, reinforced by the gas from the outer vortex, starts upwardly towards a spent gas outlet 59 while carrying feed material 22 with it in the inner vortex. This reinforced inner vortex is indicated by arrows 56.

In order to better understand the process it is convenient to start by considering a new supply of feed material 22 entering the mixing zone 30 from the bottom outlet 28 of the feed tube 26. The material will be caught up in the gas flow at the reinforced inner vortex where it will pick up a velocity which has both an upward vertical component and an outward horizontal component caused by the centrifugal effect of the vortex. As a piece of this new feed material rises in the gas flow, the horizontal component will cause the piece to escape the inner vortex and move outwardly into the downwardly moving outer vortex as indicated by the arrows 57. Once the material reaches the outer vortex, it will move downwardly with the vortex to return to the mixing zone where it will impact with new pieces of feed material and again enter the inner vortex.

However there are other factors at work in the mixing zone 30 because the process is exothermic and the feed material 22 will combust as it travels. This combustion is initiated in any convenient manner such as by the use of a starter flame carried by a lance indicated in ghost outline at 58. Once the combustion starts, it will continue as long as new feed material 22 is fed into the inner vortex through the outlet 28 and at a rate sufficient to maintain combustion. Of course the gases supplied through the first and second gas inlets must together carry sufficient oxygen to support combustion. As will be explained, the rate of introduction of feed material 22 is controlled to maintain selected temperatures in the combustion to ensure that the result is an ash of the required quality.

As a result of combustion, the feed material reentering the mixing zone from the outer vortex will be hot and the new material coming from the feed tube will be at a lower temperature. This will further cause stresses in the material to assist the mechanical impacts in breaking up the material. Some of the mixture of old and new material will travel with the inner vortex above the arrows 57 before transferring to the inner vortex at a level such as that indicated by arrows 60. The material will then return to the mixing zone 30 and this will be repeated so long as the material escapes from the inner vortex at a level below an ash outlet 62 provided in the wall 55 to collect ash which has the required characteristics needed to reach the height of the ash outlet 62. Consequently, any material that has not combusted to lose the required amount of carbon will tend to fall back into the outer vortex along paths such as those indicated by arrows 57 and 60 whereas amorphous silica ash which has developed the necessary escape criteria will pass along a path such as that shown by arrows 64, (i.e. above the ash outlets 62) before finding its way through one of the ash outlets 62.

It will be appreciated that some small fines of ash will become entrapped in the spent gas leaving through the spent gas outlet 59. In fact, the apparatus can be operated by using this as the outlet for the ash and then later trapping the ash in a separator indicated by the numeral 66. Collected ash is then taken from the separator 66 through a bottom port 68 in the separator 66.

It is important to note that as feed material enters the mixing zone 30, the stresses on the material will cause separation between particles and this will enhance the combustion. Also, because the combustion is more uniform, the combustion temperature is also more uniform in the inner vortex. This tends to limit hot spots which could heat the silica to a level where carbon would be trapped in the particle. As a result the carbon and volatile compounds are combusted leaving only the silica provided that the temperature in the inner and outer vortices is controlled below an optimum temperature. If the temperature is slightly too high, the silica will become tacky and the particles may agglomerate and tend to remain in the apparatus. Similarly, if the temperature is higher again, undesirable crystalline silica will be formed in unacceptable quantities.

The apparatus also includes a control system 69 to maintain a temperature at which the ash will form without contamination by carbon or crystalline silica while at the same time allowing the temperature to reach a level where the residence time of the feed material in the apparatus is minimized.

The control system 69 includes one or more thermocouples 70 connected to a controller 72 which is supplied with power by lines 74. The controller 72 compares known parameters for the apparatus with readings taken from the thermocouples 70 to determine whether or not the rate of flow of feed material 22 should be changed. If the temperature is too low, more material will be needed to support combustion at the desired temperature, whereas if it is too high, the rate of flow of feed material should be lowered to allow less combustion and hence a lower temperature. To achieve this, signals are sent from the controller 72 by lines 76 to a flow rate controller 78 in the material intake 24 to vary, the rate of flow of feed material 22 from a hopper 80 to the feed tube 26.

Clearly, since the temperature of combustion is controlled by varying the rate of flow of feed material 22, there must be excess oxygen provided at all times in the flow of gas through the first and second gas inlets 35 and 48.

The preferred embodiments of the methods described with reference to the drawings can be varied within the scope of the invention using different forms of the apparatus. For instance, because the vortices are not affected greatly by gravity, the apparatus can be arranged in any orientation including horizontally. Also, the guides shown in FIG. 2 can be replaced by any suitable structure that will create the inner and outer vortices. For instance a series of annular nozzles arranged to point tangentially and axially would give a similar result. Accordingly, the term 'guide' as used in this description, and in the claims, is intended to include such mechanical equivalents. These and other variations are within the scope of the invention as described and claimed.

It has been found that various parameters must be regulated by the control system for a given waste material and for the apparatus. For example, in order for a low carbon, high amorphous silica ash to be produced from rice hull waste, it has been found that the process temperature used in combustion in the inner vortex (as measured by a thermocouple inserted within the combusting mass of hull particles) is ideally in the range 830-850° C., preferably in the range 750-875° C. The higher the temperature, the faster the combustion process is completed. However, as the temperature goes above 850° C., accretion of the silica in the ash causes agglomeration followed by a transition to crystalline silica. Thus very close control of the combustion process is critical for efficient operation.

As the rice hull is combusted, it loses some 80% of its original weight, so that there is a tendency for the rice hull to be prematurely entrained out of the combustion system due to the reduced terminal velocity of the ash particle. This tendency is controlled by the selection of the velocities of the inner and outer vortices to allow only those particles of ash that meet designed escape criteria to become entrained for escape. This ensures that the apparatus retains the ash until the required percentage of carbon has been removed leaving amorphous silica having a low carbon content.

There is an initial heating process which takes place as the rice hulls are heated to produce a carbon rich ash which is then subjected to combustion in the desired temperature range while maintaining the ash in the apparatus despite the weight loss.

The use of inner and outer vortices in the manner described provides a well mixed flow of feed particles which remain in circulation between the vortices until sufficiently processed. The combination of the inner and outer vortices spinning in the same horizontal direction creates a turbulent and controlled mixing pattern resulting in improved particle separation characteristics. The particle size exhausted from the apparatus is <40 micrometers and the silica content is in excess of 97% with the remainder made up primarily of residual carbon with residual materials which are of no significance in the finished ash.

It was found that apparatus according to the invention is capable of processing whole rice hulls of varying water content, controlling the combustion reaction temperature +/−10° C. and retaining the ash until the carbon had been sufficiently combusted. By this means a commercially acceptable ash can be produced in quantities that meet all the acceptance criteria for pozzolans to be used in concrete.

The accumulation of tramp was not a problem because with careful selection of the inlet velocity of the inner vortex, the larger tramp or incombustible particles accumulated at the bottom of the apparatus. If needed an outlet could be provided for these materials at the bottom for periodic removal.

It is also possible to add a small percentage of hard inert particles to the feed material (such as silicon carbide, alumina, zirconia) to remain in the apparatus to carry out an air milling action thereby further reducing the produced particle size.

In the event that the feed material is not suitable for direct entry into the apparatus it may be necessary to chop or shred the material into smaller sizes before entry. However it has been found that the apparatus will accommodate small percentages of chopped straw thereby illustrating the capability of the device to process chopped, stringy or shredded materials.

It will also be evident that the results in using the apparatus and practicing the method of the invention will depend on how the apparatus is managed. The apparatus and the method have been used successfully to produce ash from waste materials (such as rice hull ash) to give an ash which has less than 3% by weight of carbon, and less than 1% of the silica is in the crystalline form. In fact, carbon content has been less than 1% and the crystalline carbon has been limited to trace amounts. These results were achieved with no more than due care and attention to the proper operation of the apparatus and the method.

It will now be apparent that the apparatus and method of the invention can be varied within the teaching of the invention, and that such variations are within the scope of the invention as claimed.

The invention claimed is:

1. An apparatus for the thermal treatment of waste materials, the apparatus including an intake to receive material for combustion and an ash outlet to discharge ash produced by combustion of the material, a gas supply and a spent gas outlet, a first vortex generator and a second vortex generator to create inner and outer gas vortices respectively in the apparatus about a common axis, the vortices defining a gas stream which leaves via said spent gas outlet and the gas stream containing sufficient oxygen for exothermic combustion of the feed material, the vortex generators being arranged provide flow in opposite axial directions and in the same angular direction, wherein the apparatus further includes a mixing zone located adjacent each of said vortices, said intake delivering feed material to the apparatus at said mixing zone to be entrained in the inner vortex with a centrifugal force component to cause the material to move outwardly from the inner vortex into the outer vortex and so that the material is then entrapped in the gas stream and carried repeatedly by the outer vortex into and through the mixing zone for entry back into the inner vortex so that the material is transported in the gas stream until the feed material is converted predominantly to an ash having escape criteria needed to travel through the ash outlet.

2. The apparatus as claimed in claim 1 and having a spent gas outlet positioned such that said ash is entrained in the spent gas leaving through the spent gas outlet.

3. The apparatus as claimed in claim 1 in which the material intake extends axially about said axis inside the inner vortex.

4. The apparatus as claimed in claim 1 in which each of said vortex generators is located in said gas inlet and included blades set in an annular array about said axis to impart the vortex flow.

5. The apparatus as claimed in claim 1 in which said gas supply includes respective first and second gas inlets, the gas from the first inlet creating the inner vortex, and the gas from the second inlet creating the outer vortex.

6. The apparatus as claimed in claim 1 in which a temperature sensor is provided in the gas stream and in which a flow controller operates in response to the temperature to vary the rate of flow of feed material through the intake.

7. The apparatus as claimed in claim 1 and including a separator in which the exhaust gas and ash are separated in a separator on leaving the ash outlet.

8. The apparatus as claimed in claim 5 in which the first gas inlet includes guides set in an array about said axis to impart said inner vortex flow.

9. Apparatus for making ash from a feed material, the apparatus including:
   a cylindrical housing extending about a central axis and having first and second ends, and a central mixing zone adjacent the first end;
   a material intake for carrying said feed material into the housing and having a bottom outlet in the mixing zone;
   a flow rate controller coupled to the material intake to vary the rate of flow of feed material through the intake;
   a first gas inlet at said first end and having guides to create an inner vortex extending about said axis; a second gas inlet at said second end and having guides to create an outer vortex extending about said axis, the inner and outer vortices rotating in the same direction about said axis and moving axially in opposite directions to create a gas stream;

a gas outlet positioned to receive spent gas from the housing;

an ash outlet positioned remotely from the mixing zone; and a control system having temperature sensors in the gas stream and operable in response to changes in temperatures in the gas stream to operate the flow rate controller to vary the rate of flow of the feed material into the mixing zone in accordance with temperature parameters set to limit the temperature in the feed material in the gas stream;

whereby in operation gases are fed into the first and second gas inlets to create the gas stream with sufficient oxygen for exothermic combustion of the feed material and having a flow rate to create said inner and outer vortices, the outer vortex meeting the inner vortex in the mixing zone to mix both with the inner vortex and with the feed material leaving the material intake, so that the feed material will be subjected to exothermic combustion as the feed material is entrained in the gas stream to pass through the mixing zone repeatedly until the feed material is converted predominantly to ash having escape criteria needed to exit through the ash outlet.

10. The apparatus as claimed in claim 9 in which the ash outlet and the gas outlet are positioned such that said ash is entrained in the spent gas.

11. The apparatus as claimed in claim 9 in which the material intake extends axially about said axis inside the inner vortex.

12. The apparatus as claimed in claim 9 in which said guides in the first gas inlet are blades set in an annular array about said axis.

13. The apparatus as claimed in claim 9 in which said guides in the second gas inlet are blades set in an annular array about said axis.

14. The apparatus as claimed in claim 12 in which said guides in the second gas inlet are blades set in an annular array about said axis.

15. The apparatus as claimed in claim 9 in which the ash outlet is adjacent said first end such that ash having said escape criteria will find the ash outlet as such ash moves radially between the inner vortex and the outer vortex.

16. Apparatus for exothermic treatment of siliceous feed material, the apparatus including:
a cylindrical housing extending about a central axis and having first and second ends, and a central mixing zone adjacent the first end;
a material intake for carrying said feed material into the housing and having a bottom outlet in the mixing zone;
a flow rate controller coupled to the material intake to vary the rate of flow of feed material through the intake;
a first gas inlet at said first end and having guides to create an inner vortex extending about said axis;
a second gas inlet at said second end and having guides to create an outer vortex extending about said axis, the inner and outer vortices rotating in the same direction about said axis and moving axially in opposite directions to create a gas stream;
a gas outlet positioned to receive spent gas from the housing; and
a control system having temperature sensors in the gas stream and operable in response to changes in temperatures in the gas stream to operate the flow rate controller to vary the rate of flow of the feed material into the mixing zone in accordance with temperature parameters set to limit the temperature in the feed material in the gas stream;
whereby in operation gases are fed into the first and second gas inlets to create a gas stream and carrying sufficient oxygen for exothermic combustion of the feed material and having a flow rate to create said inner and outer vortices, the outer vortex meeting the inner vortex in the mixing zone to mix both with the inner vortex and with the feed material leaving the material intake, so that the feed material will be subjected to exothermic combustion as the feed material is entrained in the gas stream to pass through the mixing zone repeatedly until the feed material is converted predominantly to amorphous silica ash having escape criteria needed to exit through the gas outlet with the spent gas.

17. The apparatus as claimed in claim 16 and further including a separator coupled to the gas outlet to separate the ash from the spent gas.

18. Apparatus for exothermic treatment of siliceous feed material, the apparatus including:
a cylindrical housing extending axially about a central axis and having first and second ends, and a central mixing zone adjacent the first end;
a material intake for carrying said feed material into the housing and having an outlet in the mixing zone;
a first gas inlet at said first end and having guides to create an inner vortex extending axially;
a second gas inlet at said second end and having guides to create an outer vortex extending about said axis, the inner and outer vortices rotating in the same direction about said axis and moving axially in opposite directions to define a gas stream;
a gas outlet positioned centrally in said second end to receive spent gas from the housing;
an ash outlet positioned remotely from the mixing zone; and
a control system having temperature sensors in the gas flow and operable in response to changes in temperatures in the gas flow to limit the temperature in the feed material in the housing;
whereby in operation gases are fed into the first and second gas inlets carrying sufficient oxygen for exothermic combustion of the feed material and having a flow rate to create said inner and outer vortices, the outer vortex meeting the inner vortex in the mixing zone to mix both with the inner vortex and with the feed material leaving the material intake, so that the feed material will be subjected to exothermic combustion as the feed material is entrained in the gas stream to pass through the mixing zone repeatedly until the feed material is converted predominantly to amorphous silica ash having escape criteria needed to leave the gas stream and exit through the ash outlet.

19. The apparatus as claimed in claim 18 in which the ash outlet and the gas outlet are positioned such that said amorphous silica ash is entrained in the spent gas.

20. The apparatus as claimed in claim 18 in which the material intake extends about said axis.

21. The apparatus as claimed in claim 18 in which said guides in the first gas inlet are blades set in an annular array about said axis.

22. The apparatus as claimed in claim 18 in which said guides in the second gas inlet are blades set in an annular array about said axis.

23. The apparatus as claimed in claim 21 in which said guides in the second gas inlet are blades set in an annular array about said axis.

24. The apparatus as claimed in claim 18 in which the ash outlet is adjacent and below said top such that ash will find the ash outlet as the ash moves radially outwards to leave the inner vortex and enter the outer vortex.

25. Apparatus for exothermic treatment of siliceous feed material, the apparatus including:
- a cylindrical housing extending about a central axis and having a first and second ends, and a central mixing zone adjacent the first end;
- a material intake for carrying said feed material into the mixing zone;
- a first gas inlet at said first end and having guides to create an inner vortex extending about said axis;
- a second gas inlet at said second end and having guides to create an outer vortex extending about said axis, the inner and outer vortices rotating in the same direction about said axis and moving axially in opposite directions, and the first and second vortices creating a gas stream; a gas outlet positioned centrally in said second end to receive spent gas from the housing; and
- a control system having temperature sensors in the gas stream and operable in response to changes in temperatures in the gas stream to limit the temperature in the feed material in the housing;
- whereby in operation gases are fed into the first and second gas inlets carrying sufficient oxygen into the gas stream for exothermic combustion of the feed material and having a flow rate to create said inner and outer vortices, the outer vortex meeting the inner vortex in the mixing zone to both mix with the inner vortex and with the feed material leaving the material intake, so that the feed material will be subjected to exothermic combustion as the feed material is entrained in the gas stream to pass through the mixing zone repeatedly until the feed material is converted to a predominantly amorphous silica ash having escape criteria needed to move in the gas stream to the gas outlet with the spent gas.

26. The apparatus as claimed in claim 25 in which the ash has a silica ash content of at least 97% by weight.

27. The apparatus as claimed in claim 25 in which the ash has a silica ash content of at least 98% by weight.

\* \* \* \* \*